March 12, 1957 F. A. HUMMEL 2,785,080
THERMAL SHOCK RESISTANT CERAMIC BODY
Filed June 23, 1950

INVENTOR
Floyd A Hummel
BY
Christy, Parmelee and Strickland
ATTORNEYS.

March 12, 1957  F. A. HUMMEL  2,785,080
THERMAL SHOCK RESISTANT CERAMIC BODY
Filed June 23, 1950  2 Sheets-Sheet 2

INVENTOR.
Floyd A. Hummel
BY
Christy, Parmelee and Strickland
ATTORNEYS.

United States Patent Office 2,785,080
Patented Mar. 12, 1957

2,785,080

THERMAL SHOCK RESISTANT CERAMIC BODY

Floyd A. Hummel, State College, Pa., assignor, by mesne assignments, to The Carborundum Company, Niagara Falls, N. Y., a corporation of Delaware Application June 23, 1950, Serial No. 170,426

5 Claims. (Cl. 106—65)

This invention relates to a new ceramic body having improved and desirable thermal shock resistant properties, and, more particularly, to a ceramic body formed of a monotropic lithium aluminosilicate having a crystalline structure.

This application is a continuation-in-part application of my pending application Serial No. 72,802, filed January 26, 1949, now abandoned.

The thermal shock characteristics of most conventional ceramic bodies are such that the bodies are unsatisfactory which they are subjected in use to rapid variations in temperature over a wide range. The inability of the bodies to withstand thermal shock is particularly evident when they are subjected to temperature variations of the order to several hundred degrees C. in time periods ranging from a few seconds to several minutes. The failure of ceramic bodies when subjected to thermal shocks of this nature is evident from the appearance of cracks in and breakage of the ceramic bodies. In those cases, such as insulators on furnaces, cooking vessels, crucibles, etc., where the body is subjected to rapid temperature changes of considerable magnitude, the conventional practice is to use the materials alumina, zircon, or cordierite (commercial form) in the formulation of the ceramic body, ceramic bodies formed from these materials exhibiting better thermal shock characteristics than other conventional ceramic bodies.

One of the principal objects of this invention is to provide a novel ceramic body which is capable of withstanding repeated thermal shocks of considerable magnitude. To this end, the ceramic body is formed from monotropic lithium aluminosilicate crystals in a manner to be more fully described below. I have found that a monotropic lithium aluminosilicate crystal ceramic body has a coefficient of expansion which compares favorably with alumina, zircon, or cordierite bodies, is capable of withstanding repeated thermal shocks, and that the coefficient of expansion of the body will vary with the molecular ratio of the silica with respect to the alumina and lithia in the crystal structure of the body.

Lithium aluminosilicates are found in the natural state in the materials known as spodumene and petalite. Typical chemical analyses of spodumene and petalite are as follows:

| Spodumene | Percent by weight | Petalite | Percent by weight |
|---|---|---|---|
| $Li_2O$ | 6.78 | $Li_2O$ | 4.49 |
| $K_2O$ | 0.69 | $K_2O$ | 0.39 |
| $Na_2O$ | 0.46 | $Na_2O$ | 0.16 |
| $MgO$ | 0.13 | $MgO$ | 0.24 |
| $CaO$ | 0.11 | $CaO$ | 0.21 |
| $Fe_2O_3$ | 0.53 | $Fe_2O_3$ | 0.18 |
| $Al_2O_3$ | 28.42 | $Al_2O_3$ | 17.24 |
| $SiO_2$ | 62.91 | $SiO_2$ | 76.16 |
| Ign. loss | 0.28 | F | 0.11 |
|  |  | Ign. loss | 0.80 |

Spodumene has been considered to have a theoretical molecular ratio of lithia-alumina-silica of 1:1:4. Petalite has been generally considered to have a similar molecular ratio of 1:1:8.

The manner in which lithia imparts desirable characteristics to glasses and glazes, particularly from the standpoint of improved fluxing properties, is well-known in the ceramic art. Because of its lithia content, spodumene and petalite have been added to ceramic compositions in varying amounts ranging up to about 15% by weight of such compositions with desirable results, and these materials have been subjected to considerable research investigations as a possible source of lithium. This research has shown that the crystal structure of both spodumene and petalite undergoes a change by the application of heat thereto. When heated to a temperature of about 1000° C., the natural crystals of spodumene undergo a physical change and invert to a form conventionally referred to as beta spodumene. The change which takes place results in a noticeable increase in volume of the material and a marked decrease in specific gravity. Natural spodumenes have a specific gravity between 3.13 and 3.20, and natural petalites have a specific gravity between 2.39 and 2.46. The change is an irreversible one, and the crystals will not revert to their original state upon further application of heat thereto. It is with this changed form of spodumene crystal, that is, beta spodumene, that this invention is primarily concerned. Since the change which takes place upon the inversion of the natural spodumene crystal to the beta form is an irreversible one due to the application of heat, the changed form for the purposes of this invention is designated as a "monotropic lithium aluminosilicate" to distinguish the material with which this invention is concerned from lithium aluminosilicates in their natural state.

Petalite undergoes a change similar to spodumene when subjected to heat. Heating of petalite converts the crystal structure from its natural state to beta spodumene with the additional molecules of silica in solid solution in the crystal. The conversion of petalite by heating is accompanied with irreversible volume and specific gravity changes as in the case of spodumene. Accordingly, it will be seen that the beta spodumene resulting from heating of petalite may similarly be defined as a "monotropic lithium aluminosilicate."

In a manner to be more specifically referred to, the monostropic lithium aluminosilicate crystal may be produced synthetically. I have also discovered that the coefficient of thermal expansion of the resultant material varies with the number of molecules of silica in solid solution in the beta spodumene crystal, and that a control of the coefficient of expansion may be had by varying the number of molecules of silicia in solid solution in the crystal.

Various specific examples illustrative of the practice of the invention will now be referred to under headings corresponding to the materials from which the low expansivity lithium aluminosilicate crystals are derived.

SPODUMENE

Spodumene in its natural state crushed to a size which will pass a 200 mesh screen is preferably subjected to an acetic-acid grind and slip cast by a plaster of Paris molding process to the shape of the articles desired in accordance with conventional practice. The foregoing is merely representative of one method of forming the material into an article of desired shape. Alternatively, the material, with or without common organic binders, can be pressed, cast, or extruded into the shape and article desired. Additions of clay in small amounts as a bonding material, and other materials such as zircon for controlling the porosity of the body, may be added in accordance with conventional practice. After shaping, the article is dried and in the dry state has a strength adaptable to machining of the article, and which compares favorably with conventional dried ceramic products.

The dried article is then heated to a temperature, and for a time depending upon the porosity desired in the finished body. The heat treatment requires a minimum temperature of 1000° C. for a period of about one hour in order that the spodumene crystals will invert from their natural state to the monotropic form, the temperature of 1000° C. being a critical temperature at which complete inversion of the spodumene to its low expansivity form takes place as will be more fully explained in connection with the accompanying graphs. Subjecting the body to heat treatment for a longer period of time will have no effect other than to decrease the porosity of the body. The body may be fired at higher temperatures, but such temperatures must be kept under 1400° C.–1425° C. at which the crystal structure will be destroyed by melting and the formation of a glass. From a practical standpoint, no beneficial results will be obtained from heating above 1300° as a non-porous body is formed at this temperature. The time of heating at the lower temperature beyond that necessary to control the porosity may also result in the formation of glass. Generally speaking, the body should not be fired for periods longer than 5 to 6 hours at the inversion temperature of about 1000° C., and should be fired for lesser periods at the higher temperatures, and in no case should the temperature be taken above the melting or liquidus temperature of 1400° C.–1425° C.

The inversion of spodumene or the reaction between synthetic oxides of $Al_2O_3$, $SiO_2$, and $Li_2O$ is defined in the claims as a reaction promoted by sintering. This inversion involves the heating of the $Al_2O_3$, $SiO_2$ and $Li_2O$ at a temperature (1000° to 1300° C.) to promote a reaction between the three ingredients to make a crystalline solid solution without fusing or melting to form glass-like products.

In the above described example of the invention, the inversion of the natural spodumene to its beta low expansitivity crystal has been described as taking place during the firing of the article. As an alternative method of practicing the invention, the spodumene may be fired to form the beta or low expansivity crystal before being shaped into an article, in which case, the fired material is reground, shaped, and then sintered to form the desired ceramic body.

Low expansivity lithium aluminosilicate crystal ceramic bodies derived from the mineral spodumene, and fabricated as described above, have been found capable of withstanding repeated thermal shocks by rapid temperature changes to room temperature from temperatures as high as 1200° C. The thermal shock characteristics of these ceramic bodies are better and they have lower thermal expansion characteristics than the conventional ceramic bodies now employed in the art where thermal shock resistance is necessary.

PETALITE

The mineral petalite may be used to form a low expansivity lithium aluminosilicate ceramic body by following the same procedure as described above for the mineral spodumene. The only difference in the use of petalite is the heating temperature to which the mineral is subjected. The critical minimum temperature at which the petalite converts into beta spodumene with the additional mols. of silica in solid solution is about 1050° C. To obtain a non-porous body, a slightly higher temperature of 1300° C.–1350° C. is employed. The liquidus temperature which must not be exceeded in any event is also higher, being of the order of about 1450° C.

The performance of bodies derived from the mineral petalite show the same desirable thermal shock characteristics as the bodies derived from spodumene. As will be presently apparent, the thermal expansion of the body derived from petalite is less per given temperature change than that of the body derived from spodumene, and will accordingly be more desirable for some purposes.

SYNTHETIC

The low expansivity lithium aluminosilicate crystals may be produced synthetically by mixing intimately silica ($SiO_2$), a good grade of alumina ($Al_2O_3$), and lithium carbonate ($Li_2CO_3$). In place of lithium carbonate, any other material which will yield lithia ($Li_2O$) may be employed. The three materials are proportioned in predetermined amounts in the mixture to yield the desired ratio of lithia-alumina-silica such as the ratio 1:1:4 typical of spodumene, the ratio 1:1:8 typical of petalite, and other ratios with different molecular contents of silica to as high a ratio of 1:1:20. Heating the intimate mixture at temperatures between 1000° C. to 1400° C. will produce large quantities of a pure synthetic beta spodumene solid solution phase. The heating may take place after the intimate mixture of raw materials have been formed to the shape of the ceramic body desired, or the intimate mixture of raw materials may be calcined at the temperature indicated above to bring about the formation of the desired phase after which the particle size may be reduced, the article shaped, and finally sintered to finish. The heat treatment requires a minimum temperature of 1000° C. and a temperature of 1400° C.–1450° C. to produce a non-porous body. Continuing the heat treatment for too long a period at any of the temperatures may result in the production of a glass phase in the body which is to be avoided.

In all of the above examples of the invention, the articles may be formed entirely from the raw materials before firing, or entirely from the beta spodumene crystals brought about from firing the raw materials, the latter case requiring subsequent steps of grinding, shaping, and sintering. In accordance with conventional ceramic practice, additive materials such as clay and zircon may be employed, but in no case should the added materials be over 20–30% by weight of the finished ceramic body. The additive materials will generally be found to increase the thermal coefficient of expansion and decrease the ability of the body to withstand thermal shock. For example, the addition of clay as a bonding material to aid in the shaping of the article will form mullite on firing which has a relatively high thermal coefficient of expansion. Since this is to be avoided if the best thermal shock properties are to be obtained, and since 5% clay by weight of the body is sufficient to provide good binding characteristics, it will be obvious that the use of greater quantities of clay will result in no additional advantages.

Numerous bodies have been made up of each of the materials spodumene petalite, and synthetically compounded lithia-alumina-silica, all fired to produce the low expansivity lithia aluminosilicate crystal ceramic bodies. All of such bodies have shown extremely good thermal shock characteristics when subjected to repeated thermal shocks resulting from rapid reduction of temperature from temperatures of as high as 1200° C. to room temperature. The ability of these bodies to withstand thermal shock is much improved as compared to conventional thermal shock resistant bodies such as alumina, zircon, and cordierite bodies.

In the accompanying drawings, there is shown a series of graphs illustrating the thermal expansion curves of typical ceramic bodies formed in accordance with the teachings of this invention, and in which all are compared with that resulting from the expansion of a body formed of fused silica glass, together with a triaxial diagram illustrating the system in which this invention falls. In this showing:

Figure 1:
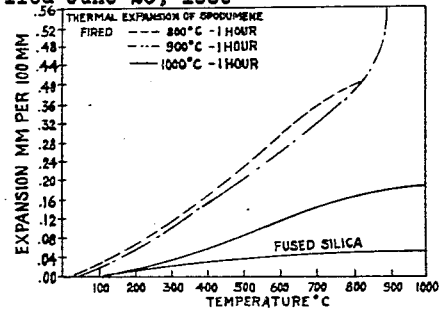
Fig. 1 is a graph illustrating the thermal expansion of bodies derived from spodumene and fired at temperatures of, respectively, 800° C.; 900° C.; and 1000° C. for one hour.
Figure 2:
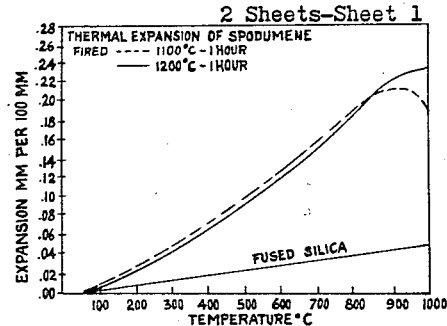
Fig. 2 is a graph similar to Fig. 1 illustrating the thermal expansion of bodies derived from spodumene and fired respectively at 1100° C. for one hour and at 1200° C. for one hour.

To obtain the data from which the graphs shown in Figs. 1 and 2 were drawn, natural spodumene was pressed into bars having the dimensions 1 cm. x 1 cm. x 11 cm. and fired to 800° C., 900° C., 1000° C., 1100° C., and 1200° C., respectively, and holding at each temperature for one hour. From these curves, it will be noted that the low or natural form of spodumene has a moderate expansion from room temperature to 900° C. giving a coefficient of approximately $40 \times 10^{-7}$ cm./cm./° C. in this range. The beginning of the alpha-beta transformation is seen in the curve for the 900° C. fire, since a rapid increase in rate of expansion is noted around 875° C. Apparently, only a partial conversion of the low form to the high (beta) form took place during the original heat treatment of 900° C. The expansion curve for the sample which was fired at 1000° C., is radically different from the first two curves due to the fact that the spodumene is now rather completely converted to the beta form. The coefficient of expansion in the range room temperature to 1000° C. has been lowered to about half its original value and is now about $19 \times 10^{-7}$ cm./cm./°C. Commercial cordierite bodies usually show a coefficient of $25 \times 10^{-7}$ or more in the limited range from room temperature to 600° C., and hence beta spodumene provides a good basis for shock resisting bodies which show distinct advantages over the cordierite type. The investigation of the expansion behavior after firing at 1100° C. and 1200° C. (Fig. 2) shows that the coefficient increases slightly to about $24 \times 10^{-7}$ cm./cm./°C.

Figure 3:
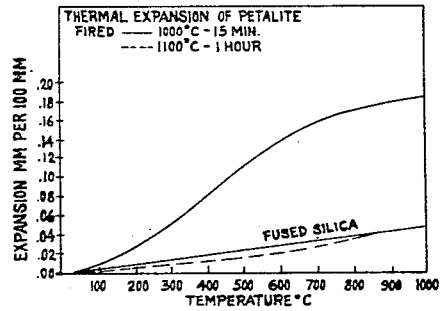
Fig. 3 is a similar graph for bodies derived from petalite fired at temperatures respectively of 1000° C. for 15 minutes and of 1100° C. for one hour.
Figure 4:
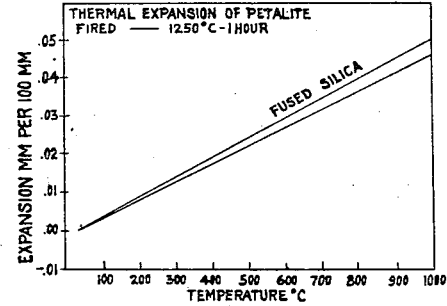
Fig. 4 is a graph similar to Fig. 3 for a body derived from petalite and fired at 1250° C. for one hour, this graph being on an enlarged scale to give a better comparison with fused silica glass.

The thermal expansion curves for similarly shaped bars formed from petalite and heated respectively to 1000° C. for 15 minutes; to 1100° C. for one hour; and to 1250° C. for one hour are shown in Figs. 3 and 4. Petalite begins to convert into beta spodumene at 1000° C. and the curve showing the expansion of a bar subjected to this temperature for 15 minutes indicates that only partial conversion has taken place with most of the movement coming in the initial stages of heating and giving a coefficient of only $19 \times 10^{-7}$ cm./cm./° C. Firing to 1100° C. for an hour brings about a very unusual change in that the expansion is a straight line and about the same as fused silica. As shown in the graph in Fig. 4 with an enlarged scale, a heat treatment at 1250° C. for one hour shows that the expansion is appreciably lower than that of fused silica.

Figure 5:
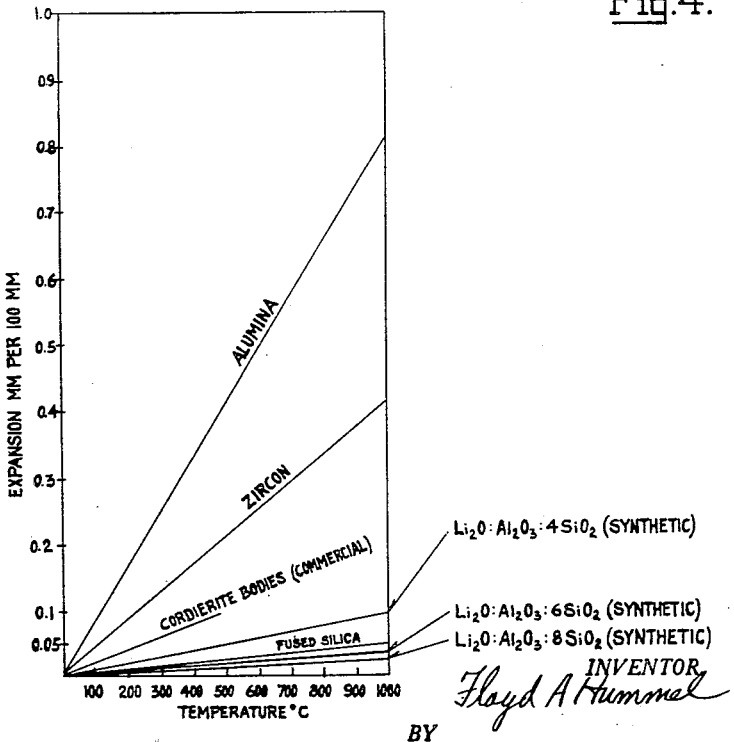
Fig. 5 is a graph showing and comparing typical expansion curves of alumina, zircon, cordierite (commercial), silica glass, and synthetic low expansivity lithia aluminosilicate crystalline bodies containing the different mols. of silica indicated.

In Fig. 5, there are shown the expansion curves for three bodies produced synthetically as described above. In the top curve, the raw materials were mixed in proportions to give a ratio of lithia-alumina-silica in the resultant monotropic crystal of 1:1:4. Similarly, the bodies, from which the lower two expansion curves were obtained, were produced from raw materials mixed to produce resultant low expansivity crystals in the ratios respectively of 1:1:6 and 1:1:8. From the three curves for the synthetic materials shown in Fig. 5, it will be noted that the thermal expansion of the resultant low expansivity crystal bodies decreases as the number of mols of silica in solid solution in the beta spodumene crystal structure is increased. Numerous other bodies were produced synthetically with varying silica molecular contents, and the thermal expansion characteristics of such bodies were noted. As a result of the tests on these bodies, it was learned that the thermal expansion continuously decreased as the ratio of the lithia-alumina-silica was increased from 1:1:4 to an intermediate ratio containing over 8, but less than 10 parts silica, at which intermediate ratio, the thermal expansion of the resultant body start rising. A body having a lithia-alumina-silica ratio of 1:1:10 has an expansion curve slightly above that of fused silica. Starting with a ratio of about 1:1:12, the expansion rises to an impractical value due to the presence of the minerals quartz or cristabolite in the body, both of which have objectionable crystallographic inversions with attendant volume changes which disrupt the ceramic body. In tests on bodies having varying lithia-alumina-silica ratios varying from 1:1:4 to 1:1:20, it was found that the ratio of 1:1:12 was the upper limit at which a body was obtained which has practical thermal shock resistant properties. Attention is particularly directed to the fact that the data obtained from the bodies produced synthetically proves that the thermal expansion of the resultant bodies may be controlled by varying the silica content in the resultant low expansivity lithia-alumina-silica crystal.

In Fig. 5, typical expansion curves for commercial alumina, zircon, and cordierite ceramic bodies have been drawn for comparison purposes. From these curves it will be noted that the thermal expansion of ceramic bodies formed in accordance with this invention are much lower than those for the conventional ceramic bodies customarily used where thermal shock resistance is a desirable consideration. Particular attention is directed to the fact that the expansion characteristics of the ceramic bodies of this invention compare favorably with and may be lower than that for fused silica glass. The importance of the invention in this respect will be particularly evident in view of the fact that it has been heretofore considered impossible to obtain a ceramic body having expansion characteristics as low as that of fused silica glass.

From the foregoing, it will be apparent that this invention provides a ceramic body having greatly improved thermal shock resistance, and a much lower thermal expansion than heretofore considered possible in the ceramic art. This is accomplished by the provision of a ceramic body comprising essentially a low expansivity lithium aluminosilicate crystal structure. As hereinbefore explained, I use the term "low expansivity lithium alumino silicate" as generic of forms of that material which has herein sometimes been designated beta spodumene without reference to the variation in the silica molecules, and which have the low expansivity and good thermal shock resistance herein referred to.

The above disclosure describes monotropic lithium aluminosilicate bodies in which the silica content is varied over the range of 1:1:4 to 1:1:20. In this range, it has been shown that the thermal expansion decreases as the silica content is increased up to a mol. content of about 10 to 12. In addition, tests have been run on bodies containing less than 4 mols. silica, and on bodies containing varying amounts of silica over a range of from 4 to less than 2 mols. of silica. These tests have developed unexpected results in that the thermal expansion of the bodies has been found to decrease as the mol. content of silica is decreased below 4, and that it is possible to obtain bodies having a zero coefficient of expansion, and to obtain bodies having a negative coefficient of thermal expansion, by decreasing the mol. silica content of the body within limits.

Generally stated, it has been found that low expansivity lithium aluminosilicate bodies having a molecular composition of 1:1:2, that is, eucryptite, have a negative coefficient of thermal expansion. As the silica content is reduced below 4 mols., a reduction in the coefficient of thermal expansion is had, and when such mol. content is reduced to 3 mols., a body having a negative coefficient of expansion is obtained. Since it has been determined that a body containing 3.5 mols. of silica has a positive coefficient of thermal expansion, and one containing 3.0 mols. of silica has negative coefficient of expansion, an indication is given that a body having a practically zero coefficient of thermal expansion exists somewhere between the limits of 1:1:3 and 1:1:3.5. The exact composition of a body having a zero coefficient of expansion has not been determined nor would it be of commercial importance and probably not capable of absolute determination. Experimental data has definitely indicated that the coefficient of expansion of bodies may be controlled by varying the silica content.

Figure 7:
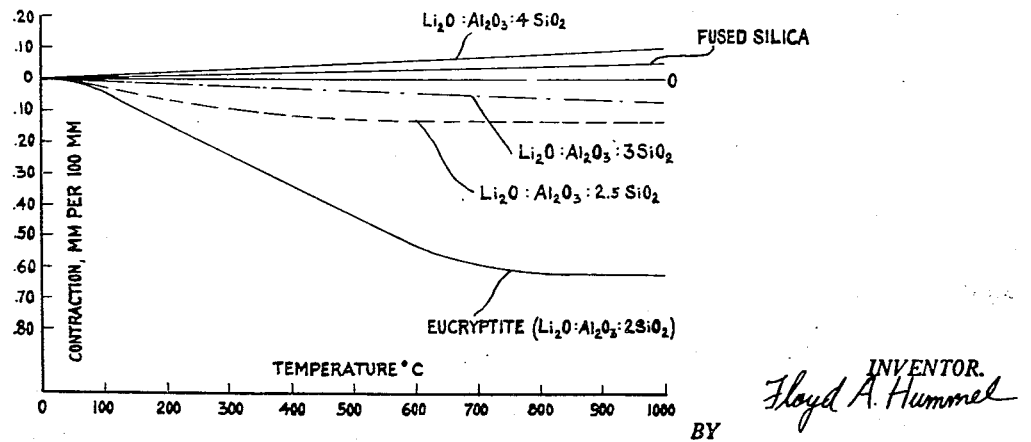
Fig. 7 is a graph similar to Figs. 1 through 5 illustrating the thermal expansion of bodies in a negative range.

In Fig. 7, the thermal expansion of various bodies between spodumene 1:1:4 and eucryptite 1:1:2 have been plotted and compared with the thermal expansion curve for fused silica. From these curves, it will be apparent that the coefficient of expansion may be controlled by varying the silica content of the bodies.

A large number of bodies have been produced synthetically as described above and tests have been run on such bodies to determine their expansion characteristics. From these bodies, 40 have been selected as examples of the invention. The bodies thus selected were formed and fired as described above. The composition of these bodies with the constituents thereof given in percent by weight is given in the following table:

*Percentage composition of mixtures*

| Composition Number | Li₂O | Al₂O₃ | SiO₂ |
| --- | --- | --- | --- |
| 1 | 10 | 10 | 80 |
| 2 | 20 | 10 | 70 |
| 3 | 30 | 10 | 60 |
| 4 | 40 | 10 | 50 |
| 5 | 5 | 15 | 80 |
| 6 | 15 | 15 | 70 |
| 7 | 25 | 15 | 60 |
| 8 | 35 | 15 | 50 |
| 9 | 5 | 20 | 75 |
| 10 | 15 | 20 | 65 |
| 11 | 25 | 20 | 55 |
| 12 | 5 | 25 | 70 |
| 13 | 15 | 25 | 60 |
| 14 | 25 | 25 | 50 |
| 15 | 5 | 30 | 65 |
| 16 | 15 | 30 | 55 |
| 17 | 25 | 30 | 45 |
| 18 | 5 | 35 | 60 |
| 19 | 15 | 35 | 50 |
| 20 | 25 | 35 | 40 |
| 21 | 5 | 40 | 55 |
| 22 | 15 | 40 | 45 |
| 23 | 25 | 40 | 35 |
| 24 | 5 | 50 | 45 |
| 25 | 15 | 50 | 35 |
| 26 | 25 | 50 | 25 |
| 27 | 10.6 | 36.2 | 53.2 |
| 28 | 8.7 | 29.8 | 61.5 |
| 29 | 9.6 | 32.7 | 57.7 |
| 30 | 6.1 | 20.7 | 73.2 |
| 31 | 4.1 | 13.9 | 82.0 |
| 32 | 3.5 | 12.0 | 84.5 |
| 33 | 2.9 | 9.9 | 87.2 |
| Eucryptite | 11.8 | 40.5 | 47.7 |
| Spodumene | 8.0 | 24.7 | 64.6 |
| Petalite | 4.9 | 16.6 | 78.5 |
| 34 | 12.5 | 42.5 | 45 |
| 35 | 13 | 45 | 42 |
| 36 | 14 | 49 | 37 |
| 37 | 5 | 55 | 40 |

As explained above, Li₂CO₃ is employed in amounts which will yield the above percentages of Li₂O upon firing.

The mol. compositions of the above mixtures, with adjustments made to indicate the Li₂O equal to one mol., are as follows:

*Mol composition of mixtures*

| Composition Number | Li₂O | Al₂O₃ | SiO₂ |
| --- | --- | --- | --- |
| 1 | 1 | 2.93 | 3.98 |
| 2 | 1 | .146 | 1.73 |
| 3 | 1 | .098 | 1.00 |
| 4 | 1 | .073 | 0.62 |
| 5 | 1 | .88 | 7.98 |
| 6 | 1 | .293 | 2.31 |
| 7 | 1 | .176 | 1.19 |
| 8 | 1 | .125 | 0.71 |
| 9 | 1 | 1.17 | 7.45 |
| 10 | 1 | .39 | 2.16 |
| 11 | 1 | .234 | 1.09 |
| 12 | 1 | 1.46 | 6.95 |
| 13 | 1 | .488 | 1.99 |
| 14 | 1 | .293 | 0.99 |
| 15 | 1 | 1.76 | 6.53 |
| 16 | 1 | .587 | 1.82 |
| 17 | 1 | .351 | 0.89 |
| 18 | 1 | 2.06 | 5.98 |
| 19 | 1 | .685 | 1.65 |
| 20 | 1 | .412 | 0.79 |
| 21 | 1 | 2.36 | 5.48 |
| 22 | 1 | .784 | 1.49 |
| 23 | 1 | .47 | .69 |
| 24 | 1 | 2.93 | 4.49 |
| 25 | 1 | .977 | 1.16 |
| 26 | 1 | .587 | .49 |
| 27 | 1 | 1 | 2.5 |
| 28 | 1 | 1 | 3.5 |
| 29 | 1 | 1 | 3.0 |
| 30 | 1 | 1 | 6.0 |
| 31 | 1 | 1 | 10.0 |
| 32 | 1 | 1 | 12.0 |
| 33 | 1 | 1 | 15.0 |
| Eucryptite | 1 | 1 | 2.0 |
| Spodumene | 1 | 1 | 4.0 |
| Petalite (beta spodumene solid solution) | 1 | 1 | 8.0 |
| 34 | 1 | 1 | 1.8 |
| 35 | 1 | 1 | 1.68 |
| 36 | 1 | 1 | 1.48 |
| 37 | 1 | 3.23 | 1.16 |

A comparison of the thermal coefficient of expansion from room temperatures (R. T.) to 1000° C. is given in the following table:

*Thermal expansion coefficient in the range room temperature to 1000° C.*

| Composition Number | Coefficient of Expansion ($\times 10^{-7}$) |
| --- | --- |
| 1 | Too low melting. |
| 2 | Do. |
| 3 | Do. |
| 4 | Do. |
| 5 | 7. |
| 6 | 36 (R. T. to 800° C.). |
| 7 | 45 (R. T. to 800° C.). |
| 8 | Too low melting. |
| 9 | 5. |
| 10 | Not determined. |
| 11 | 37.5. |
| 12 | 4. |
| 13 | 12. |
| 14 | −7. |
| 15 | 8.5. |
| 16 | −38. |
| 17 | −21. |
| 18 | 10. |
| 19 | −44. |
| 20 | −25 (R. T. to 600° C.). |
| 21 | 17. |
| 22 | −40. |
| 23 | 105. |
| 24 | 18. |
| 25 | −13. |
| 26 | 140. |
| 27 | −12.5. |
| 28 | 6.5. |
| 29 | −10.0. |

| Composition Number | Coefficient of Expansion (×10⁻⁷) |
| --- | --- |
| 30 | 4.0. |
| 31 | 5.0. |
| 32 | Unstable. |
| 33 | Do. |
| Eucryptite | −70. |
| Spodumene | 10. |
| Petalite (beta spodumene solid solution) | 2. |
| 34 | −53. |
| 35 | −38. |
| 36 | −20. |
| 37 | 33. |

Figure 6:
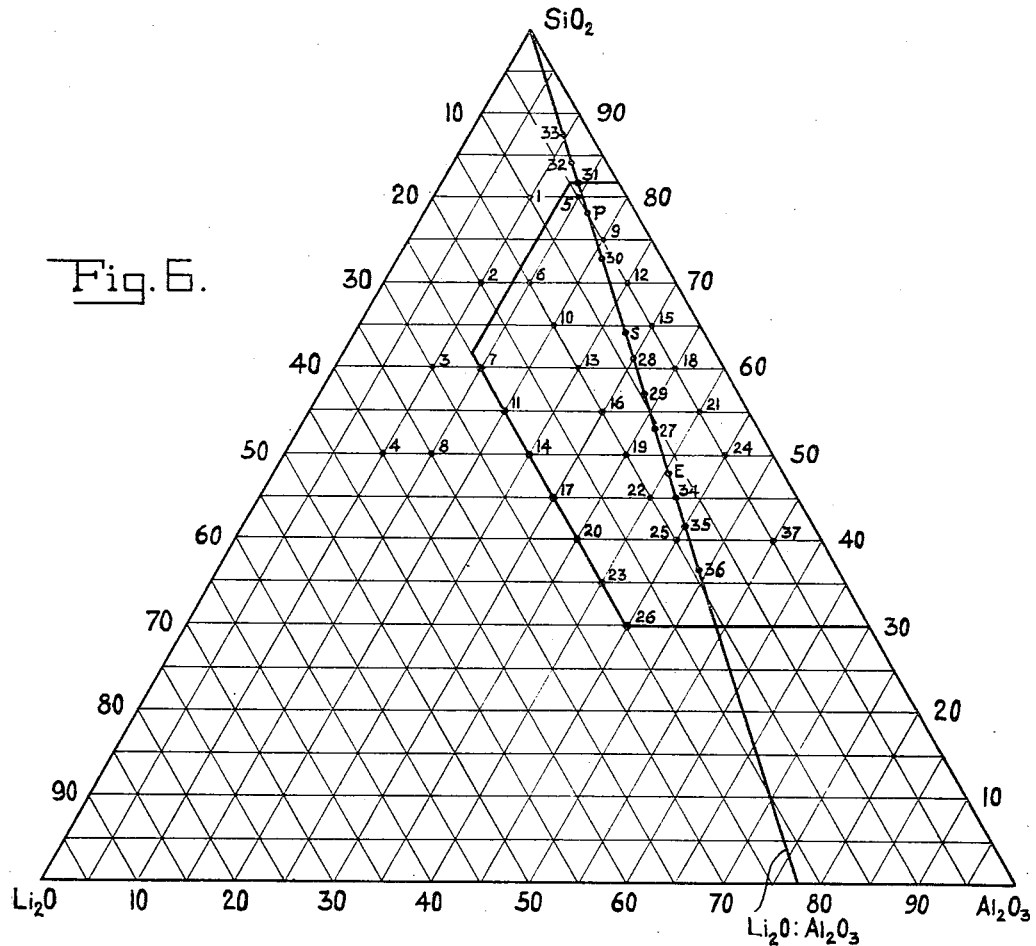
Fig. 6 is a triaxial diagram representing the system $Li_2O$; $Al_2O_3$; $SiO_2$ and showing compositions in this system demarcating the field of this invention.

To facilitate consideration of the characteristics of the above bodies, they have been spotted by number on the triaxial diagram of Fig. 6, in which P designates the synthetic composition corresponding to petalite, S the synthetic composition corresponding to spodumene, and E the synthetic composition corresponding to eucryptite.

From the triaxial diagram of Fig. 6 in conjunction with Table No. 3, it will be apparent that useful compositions will be found within the area bounded by solid lines and ranging from a few percent to 25% $Li_2O$, from 30% to 82% $SiO_2$ and 13% to 70% $Al_2O_3$. The limitation of a few percent $Li_2O$ is meant to be less than 5%, since compositions containing a smaller percentage will be mainly silica and alumina and will contain fairly high percentages of mullite along with spodumene or eucryptite crystals. Some mullite in the bodies will not be found harmful since it increases the refractory properties and does not increase the expansion characteristics too much. The limitation of few percent $Li_2O$ is intended to eliminate bodies containing 0% $Li_2O$ or bodies consisting essentially of mullite with which this invention is not concerned.

From the accompanying diagram and Table No. 3, it will be noted that the boundaries are established by compositions 1 through 4 and 8, which bodies melted at too low a temperature and displayed eutectic properties, and compositions 32 and 33 which were unstable. The lower limit of silica content was determined by noting the increasing coefficient of thermal expansion. For example, the lowest negative coefficient of expansion was given by the composition E, eucryptite. As the mol. silica content of the compositions was reduced below E, that is below 1:1:2, as in the case of compositions 34–37, the negative coefficient of expansion started to fall off. This was due to the production of a composition consisting of eucryptite crystals having a binary compound (lithia alumina), a material having a high coefficient of expansion, suspended therein. This feature excludes compositions having a smaller percentage of silica than 30% since such compositions would contain too much $Li_2O$, $Al_2O_3$ and would result in a body of two crystals respectively having high negative and positive coefficients of expansion. Such bodies would have poor thermal shock properties, and would for this reason be undesirable. In the range of compositions containing more than 2 mols. of silica, only a single crystal is had which is one having varying mols. of silica in solid solution therewith, that is, essentially either a spodumene or eucryptite crystal. Of course, near the outer limits of the area demarcated on the diagram, small amounts of binary compounds or crystals will be found suspended in the ternary composition, but the composition will be found to be essentially a ternary composition, that is, a monotropic lithium, aluminosilicate composition.

From the foregoing, it will be apparent that the ternary compound, low expansivity lithium aluminosilicate, of this invention is of use over the entire range of from less 1:1:2 to about 1:1:12 as described above. The useful compositions in this system for the purpose of this invention will be found in an area adjacent that and on both sides of the line in which the lithia and alumina are present in the mol. ratio of 1:1. As the mol. silica content is varied in this area, compositions are obtained having different but not necessarily proportional coefficients of thermal expansion which vary over a reproducible range from a negative value to a positive value. Since the useful area of the system is that encompassing the line in which the mol. content of alumina and lithia has a ratio of 1:1, it will be understood that any definition calling for substantially 1 mol. lithia, 1 mol. alumina, and a variable number of mols. of silica, is meant to include those useful compositions in the area about the line representing a ratio of 1:1 and in which the ratio of lithia to alumina may not be precisely 1 to 1.

The examples of the invention given in the above tables were all formed by mixing chemically pure lithium carbonate in an amount which would yield the desired amount of lithia upon firing, chemically pure alumina, and silica in the form known as potters flint. These materials in powder form were mixed intimately and then water was added to facilitate molding. Thereafter the mixture was dried in the mold at 110° C., and when dry, was heated to 1300° C. and held at this temperature for 24 hours. The molded material was then cooled and crushed in a steel mortar. The crushed material was then mixed with less than 1% of an organic binder, methylcellulose and carbo-wax, and pressed in a metal mold to form a bar having the dimensions 11 cm. x 1 cm. x 1 cm. The bar was then sintered at 1300° C. for a period of 30 to 60 minutes to remove the binder by oxidizing. The coefficient of thermal expansion was then taken for each bar over a range from room temperature to 1000° C. In those cases where the range was not taken to 1000° C., the maximum temperature to which the bar was subjected has been noted in the above table.

While I have illustrated and described several embodiments of my invention it will be understood that this is merely by way of illustration, and that various changes and modifications may be made therein within the contemplation of my invention and under the scope of the following claims.

I claim:

1. A method of making a thermal shock resistant ceramic body which comprises forming and shaping to predetermined size and contour finely divided particles of $Li_2CO_3$, $Al_2O_3$ and $SiO_2$ which yield upon firing a crystalline structure having essentially the composition $Li_2O$, $Al_2O_3$ and $SiO_2$ in the approximate range of 1:1:2 to 1:1:10 of said oxides in the order named, and sintering the body so formed at a temperature between about 1000° C. and the liquidus temperature of the mass between about 1300° C. and 1450° C.

2. The method of making a thermal shock resistant body which comprises forming and shaping to predetermined size and contour finely divided particles of the beta form of a mineral of the class consisting of spodumene and eucryptite and firing the body so formed at a temperature between about 1000° C. and the liquidus temperature of the mass between about 1300° C. and 1450° C. until the body has become sintered.

3. The method defined in claim 2 in which the finely divided particles are united by a temporary bond.

4. The method defined in claim 2 in which the $Li_2O$ is produced in situ from $Li_2CO_3$ initially incorporated into the body and reduced upon heating.

5. The method defined in claim 2 in which the finely divided particles are united by a temporary bond in which the temporary bond comprises not more than about 5% of clay.

(References on following page)

References Cited in the file of this patent

Ford: Dana's Manual of Mineralogy, 13th ed., pp. 1 to 4, incl. (Copy in Div. 38.)

Mellor: "Comprehensive Treatise on Inorganic and Theoretical Chemistry," Longmans, Green & Co., New York, 1925, vol. 6, p. 569. (Copy in Div. 59.)

Ceramic Industry, January 1945, pp. 110–111. (Copy in Div. 3.)

U. S. Bureau of Mines: Report of Investigations, R. I. 3336, February 1937, pages 1, 2 and 3. (Copy in Pat. Office Library, TNI–U8.)